(12) United States Patent
Wilhelm et al.

(10) Patent No.: US 9,696,499 B2
(45) Date of Patent: Jul. 4, 2017

(54) OPTICAL SWITCH AND BEAM STABILIZATION DEVICE

(71) Applicant: Carl Zeiss Microscopy GmbH, Jena (DE)

(72) Inventors: Stefan Wilhelm, Jena (DE); Michel Stutz, Munich (DE)

(73) Assignee: Carl Zeiss Microscopy GmbH, Jena (DE)

( * ) Notice: Subject to any disclaimer, the term of this patent is extended or adjusted under 35 U.S.C. 154(b) by 0 days.

(21) Appl. No.: 14/312,913

(22) Filed: Jun. 24, 2014

(65) Prior Publication Data

US 2015/0015929 A1    Jan. 15, 2015

(30) Foreign Application Priority Data

Jun. 24, 2013   (DE) .................. 10 2013 010 731

(51) Int. Cl.
| | |
|---|---|
| *G02B 6/35* | (2006.01) |
| *G02B 21/06* | (2006.01) |
| *G02B 21/00* | (2006.01) |
| *G02B 26/08* | (2006.01) |

(52) U.S. Cl.
CPC ....... *G02B 6/3518* (2013.01); *G02B 21/0088* (2013.01); *G02B 21/06* (2013.01); *G02B 6/357* (2013.01); *G02B 6/3548* (2013.01); *G02B 6/3588* (2013.01); *G02B 26/0833* (2013.01)

(58) Field of Classification Search
CPC .... G02B 26/0841; G02B 21/22; G02B 21/06; G02B 26/108; G02B 26/10; G02B 26/105; G02B 26/001

USPC ......... 359/196.1, 197.1, 198.1, 199.1–199.4, 359/201.1–201.2, 212.1, 212.2, 213.1,
(Continued)

(56) References Cited

U.S. PATENT DOCUMENTS

| | | | |
|---|---|---|---|
| 5,253,834 A | 10/1993 | Sullivan et al. | |
| 5,923,418 A * | 7/1999 | Clark ...................... | G01S 17/66 356/153 |

(Continued)

FOREIGN PATENT DOCUMENTS

| | | |
|---|---|---|
| DE | 103 61 177 A1 | 7/2005 |
| DE | 10 2006 034914 A1 | 1/2008 |

(Continued)

*Primary Examiner* — Mohammed Hasan
*Assistant Examiner* — Rahman Abdur
(74) *Attorney, Agent, or Firm* — Duane Morris LLP

(57) ABSTRACT

Optical switch for adjustable deflection of a light beam from the direction of an input point in the direction of one of several output points. The optical switch includes a switching mirror sensitive to changes in environmental conditions, such as temperature fluctuations. Also included is a rotatable capturing mirror, two beam splitters, and two spatially-resolving detectors. Both mirrors can be rotated around respective axes. A front beam splitter for the partial coupling of the light beam at the front detector that is optically positioned between the capturing mirror and the switching mirror, while the back beam splitter for the partial decoupling of the light beam at the back detector is arranged optically between the switching mirror and each of the output positions. A control unit is adapted to control the drive of the switching mirror on the basis of a signal from the back detector.

26 Claims, 7 Drawing Sheets

(58) Field of Classification Search
USPC ... 359/214.1, 223.1, 225.1, 226.1, 237, 372, 359/388, 392; 385/116, 117
See application file for complete search history.

(56) References Cited

U.S. PATENT DOCUMENTS

| | | | | |
|---|---|---|---|---|
| 6,801,684 B2* | 10/2004 | Losch | ................ | H04Q 11/0005 385/15 |
| 6,952,026 B2* | 10/2005 | Lindholm | ......... | H01L 31/02024 257/183 |
| 7,009,763 B1* | 3/2006 | Wolleschensky | .... | G02B 21/002 359/368 |
| 7,295,726 B1* | 11/2007 | Milanovic | .......... | G02B 26/0841 385/14 |
| 7,760,776 B2 | 7/2010 | Redford | | |
| 7,869,679 B2 | 1/2011 | Viellerobe et al. | | |
| 8,228,609 B2* | 7/2012 | Bergann | ............. | G02B 27/1006 359/634 |
| 2007/0291277 A1* | 12/2007 | Everett | .................. | A61B 3/102 356/497 |
| 2011/0028955 A1* | 2/2011 | Raksi | ..................... | A61F 9/008 606/4 |
| 2011/0102887 A1 | 5/2011 | Redford | | |
| 2012/0300197 A1 | 11/2012 | Richter et al. | | |
| 2012/0320111 A1* | 12/2012 | Hagood, IV | ......... | G02B 26/004 345/690 |

FOREIGN PATENT DOCUMENTS

| | | |
|---|---|---|
| JP | 2011-158688 A | 8/2011 |
| WO | WO 01/24384 A2 | 4/2001 |
| WO | WO 01/93340 A1 | 12/2001 |
| WO | WO 2009/012846 A1 | 1/2009 |

\* cited by examiner

OPTICAL SWITCH AND BEAM STABILIZATION DEVICE

RELATED APPLICATIONS

The present application claims priority benefit of German Application No. DE 10 2013 010 731.8 filed on Jun. 24, 2013, the contents of which are incorporated by reference in its entirety.

FIELD OF THE INVENTION

The invention relates to an optical switch, in particular for microscopes, for adjustably deflecting a light beam from the direction of an input point in the direction of one of a plurality of output points, having a rotatable switching mirror, which has a micro-electro-mechanical drive and a control unit for adjusting the switching mirrors. An optical switch may also be referred to as an optical multi-way adapter.

According to the invention, the term "light" includes any electromagnetic radiation manipulated by optical means, thus in particular ultraviolet, visible and infrared radiation. Each input or output point may be an interface, for example in the form of a fiber optic connection ("fiber coupler"), or another optical element arranged downstream of the mirror. Alternatively, particularly when integrating the optical switch in free-space optics, it may be a respectively predetermined point in space.

BACKGROUND OF THE INVENTION

Optical measuring instruments usually require one or more light sources, which are expensive in terms of acquisition and/or the required installation space, such as is the case for lasers. To minimize cost, it is therefore desirable to use a light source in various instruments or at different inputs of a multi-function measuring instrument, so that a separate light source does not have to be provided for each measuring instrument or each input. The light source should be flexible in use and also be easy to combine with other light sources. In this way, each light source may be optimally exploited and utilized.

To this end, a modular apparatus for providing a laser beam is described in DE 103 61 177 A1 with defined interfaces to the outside. The apparatus may be sequentially connected to various measuring instruments. The manual changing of the connections (re-plugging) from one measuring instrument to another, however, is not easy to effect and is time consuming.

A greatly improved modular laser source is known from U.S. Pat. No. 7,760,776 B2. It may comprise an optical switch for switching between two or more optical outputs. This optical switch may, in particular, comprise a movable mirror. As a result of the ability to switch, several measuring instruments (or several inputs of the same measuring instrument) may remain permanently connected to the device. Time-consuming manual re-plugging is then no longer necessary. However, no automatic switching is described, so that switching is slow.

Modern microscopes allow the implementation of various methods on the same stand. One example is the combination of the techniques of fluorescence recovery after photobleaching (FRAP), total internal reflection (TIRF) and confocal scanning. A confocal scanning microscope may be either a point scanning system, such as a laser scanning microscope, or a multifocal scanning system, for example based on a Nipkow disk, as well as a line scanning system. Typically, in such combinations, the individual sub-processes are carried out repeatedly at specific time sequences of a few milliseconds during a measurement cycle. Manual changing of the input is thus avoided.

A further problem arises when the outputs of an optical switch are irradiated inaccurately (for example, the switchable beam falls partially or completely next to the chosen output—positioning error—or at an angle to it—angular error). This can lead to loss of intensity while, under certain circumstances, a part of the beam may not reach the output. This is especially true when the outputs are constructed as fiber couplers, as these are highly sensitive with respect to the incident angle and the incident position of the beam. Problematically, these errors may, in spite of an initial high-precision adjustment of the beam paths, occur only during a measurement, for example because of thermally-induced changes in the optical geometry of the laser, the beam paths to the switch and/or the switch itself. In addition to permanent intensity losses, undesirable fluctuations in intensity may then occur, particularly during a measurement. Such undesirable fluctuations may also occur during the actual switching operation due to the input and output processes of the switching mirror.

A detection-side optical switch with a galvanometer as a switching mirror is described in US 2011/0102887 A1. Switching is slow due to the inertia of the galvanometer mirrors. Due to the temperature sensitivity of galvanometer mirrors, the accuracy of the switching and the stabilization during the course of a measurement is not guaranteed. This also applies to environmental variations of the beam paths, such as temperature fluctuations.

The optical switch described in JP-A 2011158688 enables faster switching in the range of milliseconds. It comprises a matrix of micro-mirrors that is adjustable by means of an actuator in the form of a micro-electro-mechanical system (MEMS). This allows for the distribution of a light beam to a plurality of outputs having variable relative splitting ratios. The switching between the outputs is fast, but again becomes inaccurate during the course of a measurement. The actual switching process is slow until a defined mirror position is reached because of the input and output processes.

A more accurate method of controlling optical switches in telecommunications technology is known, for example, from WO 01/24384 A2 and is based on two series-connected micro-mirrors driven by a MEMS. In this case, control of the mirror positions is effected by means of a pilot light beam that is reflected into the light beam upstream of the foremost mirror, and is detected in a respective quadrant diode per switch output downstream of the rearmost or back mirror for use in the control of the mirror positions. However, this type of control requires relatively long switching times between the various outputs until a defined mirror position is reached because of the input and output processes. The inaccuracy in the presence of thermal changes in the environment is also still relatively large.

SUMMARY OF THE INVENTION

The invention has an object of improving an optical switch of the type mentioned above, so that faster and more precise switching between a plurality of outputs is possible. Preferably, the duration of a switching process lies within the range of a few milliseconds, while the spatial positioning of the switchable beam has a precision of μrad or in the sub-μm range.

The above object is achieved by an optical switch, having the features in claim 1.

Embodiments of the invention are defined in the subclaims.

According to the invention, the improved optical switch has a rotatable capturing mirror (upstream of the switching mirror in the light propagation direction), two beam splitters and two (multi-dimensional) position-resolving detectors, whereby both of the mirrors are rotatable around two (different from each other) respective axes, whereby a front beam splitter (in the beam propagation direction) for the partial coupling of the light beam is arranged on a detector (in the front of the beam propagation direction) that is optically positioned between the capturing mirror and the switching mirror, while a back beam splitter (in the beam propagation direction) for the partial coupling of the light beam to the other detector (rearmost in the beam propagation direction) is arranged optically between the switching mirror and each of the output points, and whereby the control unit controls the drive of the switching mirror based on a signal from the back detector. The spatial resolution of each detector may be digital or analog, so that the output location information signals may be received either as discrete values (e.g. CCD or CMOS, as well as ICCD, EMCCD), or continuous values (e.g. position sensitive diode or lateral diode). In what follows, both variants are considered as sub-types of position-sensitive detectors (PSD). This also includes quadrant diodes and other segmented detectors. Preferably, the beam splitters are not only visually, but also geometrically arranged between the mirrors and between the switching mirror and the output points, and thus usefully on the respective connection line.

According to the invention, the terms "capturing mirror" and "switching mirror" serve to differentiate the two mirrors and have no other meaning than the term "mirror". At each instance, the term "switching mirror" may be replaced by "rear mirror" or "foremost mirror", and the term "capturing mirror" by "front mirror" or "capturing mirror". Accordingly, the term "back detector" may be replaced by "front detector" or "switching detector", and the term "front detector" by "second detector" or "secondary detector". Accordingly, the term "back beam splitter" may be replaced by "front beam splitter" or "secondary beam splitter", and the term "front beam splitter" may be replaced by "secondary beam splitter" or "switching beam splitter". The terms "foremost" and "front" may be used herein interchangeably, and the terms "rearmost" and "rear" or "back" may also be used interchangeable. The expression "secondary mirror" may be used interchangeably with the expression "capturing mirror".

Another aspect of the invention provides for a device for stabilizing a light beam from the direction of an input point towards an output point with a rotatable target mirror (hereinafter also referred to as a switching mirror, even though it is not used for switching in the stabilization device), with a micro-electro-mechanical drive and a control unit to adjust the target mirror, a rotatable capturing mirror having a micro-electro-mechanical drive, a control unit for adjusting the capturing mirror, two beam splitters and two spatially resolving detectors, whereby both mirrors may be rotated about two respective axes, while the front beam splitter (in the beam propagation direction) for the partial coupling of the light beam is arranged on a detector (foremost in the beam propagation direction) that is optically positioned between the capturing mirror and the target mirror (rearmost in the beam propagation direction), while the back beam splitter (in the beam propagation direction) is located optically between the target mirror and the output point for the partial coupling of the light beam on the other detector, while the control unit of the target mirror controls the drive of the target mirror based on a signal from the back detector, whereby the control unit of the capturing mirror is arranged to control the drive of the capturing mirror based on a signal from the front detector. This is virtually an optical switch in accordance with the preceding paragraph, but with only one output point and obligatory control of both mirrors. Where multiple output points are hereinafter referred to, this is to be understood as a single output point with respect to this aspect of the invention.

The capturing mirror is positioned and rotated, or is at least rotatable, in order to reflect the light beam from the direction of the input point to the switching mirror, while the switching mirror can be rotated to different positions (any preferred position) in order to reflect (accurately) the light beam from one of the capturing mirrors to one of the output points. A light beam coming from the input point thus first hits the capturing mirror and is then reflected to the switching mirror, so that the capturing mirror is foremost while the switching mirror is the rearmost in the light propagation direction.

In addition, it is particularly advantageous to arrange the mirror, the beam splitter and the detectors on a common mechanical support, in particular to so fix them (but without limitation on their rotatability) as to prevent, or at least minimize, changes in their positions with respect to one another.

The series connection of two biaxial adjustable mirror enables two-stage compensation for errors in the position and direction of the incident light beam, and thereby high-accuracy deflection in a predetermined direction as well as stabilization of the light beam in this direction. The front mirror (capturing mirror) is used to direct the light beam coming from the input point regardless of its angle of incidence and its incidence at a defined position, i.e. to the rearmost mirror (switching mirror). To this end, the said front detector enables the adjustment of the front mirror with high accuracy, preferably with respect to the reference position of the decoupled partial beam to the detector on the rearmost mirror, in particular its point of rotation. So first of all, all possible errors in location and/or direction of the light beam may be at least partially compensated. The back mirror then serves to deflect the light beam in the predetermined direction, preferably to one of the respective output points corresponding to a reference position of the second decoupled partial beams at the back detector. As a result of the pre-compensation of the spatial and angular errors at the foremost or front mirror, the remaining error—almost exclusively angular error—is less than in the prior art with only one moving mirror, so that the switching mirrors must provide lower compensation when compared with the prior art.

Ideally, the initial spatial and angular error of the light beam may be fully compensated by the capturing mirror, so that the switching mirror only serves for switching. With only one movable mirror according to the prior art, such compensation of location or positional errors of the input beam is not possible. Lower residual error at the switching mirror means lower amplitudes of movement of this mirror, and thus a better (more accurate and faster) stabilization of the deflection and a more rapid switching between various switch outputs. In particular, the amplitudes of input and output processes may be reduced in this way.

The control circuit of the switching mirror receives the predetermined direction in which the beam from the switching mirror is to be guided. The direction may be given, for example, in the form of a direction vector (with the switching mirror, in particular its point of rotation, as the associated reference point), or in the form of angles (for example, Euler), or in the form of a target position vector. But, preferably, it is in the form of a reference point on the back detector (for example, coordinates or corresponding position information signal values). The control circuit of the switching mirror then automatically switches the beam direction in accordance with a new specified reference point.

The actual switching between the output points is accomplished solely by means of the rearmost mirror. The foremost mirror remains in a constant position during the switching. A temporal overlapping during a switching process of the foremost mirror may be necessary only if changes in the beam paths occur, for example as a result of vibration or thermal effects. Due to the shortness of a switching process, the adjustment of the foremost mirror during the switching may also be regarded as approximately constant.

Particularly preferred are embodiments in which the switching mirror is smaller than the capturing mirror (with respect to its reflective or entire surface expressed in terms of its diameter or edge length). The smaller mirror has lower inertia and, in conjunction with a correspondingly stiffer actuator, a higher natural frequency—ideally more than 1 kHz. It can thus be driven with higher dynamics, i.e. moved faster (greater acceleration and deceleration). The foremost mirror may advantageously have a significantly lower natural frequency, since it is not required for the rapid switching between the various output points. In particular, a larger mirror diameter is possible, so that the rearmost mirror, and thus the output points have a larger aperture in terms of changes in the position or angle of the light beam at the input points.

A series arrangement of mirrors of different sizes thus constitute, as it were, an optical funnel, whose large input aperture may be covered with relatively coarse spatial and directional inaccuracy of the light beam, and whose output aperture transmits the light with smaller positional and directional error. This error may be kept so small that it corresponds to the resolution of a detection system. The position error of the light beam at the rearmost mirror is nearly or is identical to zero due to the pre-compensation at the foremost mirror, so that a smaller mirror diameter (or edge length) is adequate. It is sufficient if the mirror surface corresponds to the beam cross-section (in the case of a beam with a non-uniform cross-section, the laser beam is preferably two to three times the $1/e^2$ diameters), or is at least sufficiently large so that it can completely receive and reflect the beam. This allows lower switching times to be achieved.

The back detector should be so arranged (and designed), that for each of the output points of the decoupled part of the light beam at the back beam splitter, each which is reflected respectively by the switching mirror in the direction of the respective output point, its whole cross-section is received by the light-sensitive surface of the back detector. In this way, the light beam is detected with high accuracy even when switching between two outputs, and its position determined. This allows controlled switching of the switching mirror and thus an earlier response to a possible unwanted behavior of the mirror.

Preferably, the control unit of the switching mirror performs the control of the adjustment of the switching mirror independently of the adjustment of the capturing mirror and/or independently of all the position information output from the front detector. This reduces the number of variables to be evaluated in the control loop, thus reducing the response time.

Particularly advantageous are embodiments in which the switching mirror has a (constant) spatially-fixed pivot point. Preferably, the pivot point is located in a mirror surface of the switching mirror. This will avoid impressing an additional spatial and angular error dependent on the rotational pitch of the rearmost mirror on the light beam. This makes possible maximum deflection accuracy and switching speed. A mirror with a spatially-fixed point of rotation (i.e. two spatially-fixed intersecting rotary axes with independent rotation and preferably lying at the mirror surface) is described in U.S. Pat. No. 5,253,834 A. A mirror with a spatially-fixed point of rotation and a MEMS actuator is known, for example, from U.S. Pat. No. 7,295,726 B1, the disclosure of which is included herein, (especially FIGS. 12 and 13). Preferably, the MEMS actuator of the switching mirror includes one or more electrostatic actuators.

Preferably, an optical path from the back beam splitter to the back detector, in particular an input optics of the back detector, is identical or at least approximately identical to an optical path from the back beam splitter to each of the output points. As a result, assuming the same isotropic behavior of the mechanical support, there are the same material leverage ratios. Position changes (due to thermal or mechanical loading) of the output points then correspond advantageously with the same or at least similar changes in position of the light beam at the detector, so that the fullest possible compensation of these is possible. This enables a modular design of the optical switch, and thus an exchange at low cost.

Preferably, an optics is upstream of the back detector, which converts the angular changes of the switching mirror into positional changes at the back detector. Thus, the control loop of the switching mirror—in contrast to the control loop of the capturing mirror—is insensitive to changes in the position of the laser beam. The focal length of the optics and the design of the detector electronics is thus preferably so arranged that angular changes of ideally 1 μrad lead to a change in position on the detector, which gives a resolvable change in position, i.e. a difference in the position information output by the detector.

Particularly advantageous are embodiments, in which the control unit of the switching mirror is adapted to determine values for a control parameter to drive the switching mirror (in the case of a digital control loop in successive repetition cycles), so that the position of the mirror approaches the reference position with monotonically decreasing amplitude, especially with monotonically decreasing velocity, in particular, at least approximately, according to an aperiodic critical damping, and thus controls the drive accordingly. This special form of avoidance of overshooting enables a quick stabilization or a short switching time to be achieved. The minimum possible switching time is achieved in the case of aperiodic critical damping.

A digital control loop for the switching mirror may preferably be designed so that the control unit comprises a digital processor and a memory with a look-up table (LUT, as well as a map) for the control parameter as a function of the current beam position at the back detector, and as a function of the predetermined direction of deflection, in particular in the form of a reference position at the said back detector. Alternatively, the digital control circuit may advantageously effect static control purely for stabilization of the momentary preset deflection direction and dynamic control during a switching process (i.e. immediately after a change in the predetermined direction of deflection). Advantageously, the memory of the control unit comprises a plurality of look-up tables, preferably two for each possible deflection direction (reference position), one of which is for static control and one for dynamic control. Alternatively, only one lookup table may be provided for each reference position. To change the preset deflection direction, the lookup table momentarily being used for control is then easily changed, for example by overwriting of an address pointer, which refers to the current lookup table.

Repetition frequencies of a digital control loop to adjust the switching mirrors are greater than 100 MHz, and in particular greater than 500 MHz, preferably at least 1 MHz. The actual position of the mirror is determined, and the drive is controlled with this frequency. This allows a quasi-continuous digital control.

Alternatively, or in addition to the use of lookup tables, the control unit of the switching mirror (for controlling the adjustment of the rearmost mirror) may be so arranged by means of one of several default (selected) output points, a reference position of the switching mirror, and by using the signal from the back detector, in order to determine the actual position of the mirror, and to determine the value of a deviation between the reference position and the actual position, and by means of this value and a value of a previously determined deviation and/or a value obtained since the determination of the previous deviation time, to determine a control parameter to drive the switching mirror, and to control correspondingly the drive (and save the deviation value determined for the subsequent cycle). In this way, one also achieves a damping of the mirror movement, so that overshooting is reduced or even avoided. For example, the control unit may determine the momentary rotational speed of the mirror based on the elapsed time period and increase or decrease it as a function of the momentary position.

Particularly preferred are those embodiments in which the rear detector has an isotropic light-sensitive surface, and produces continuous position information that is output as a signal (PSD in the strictest sense, in particular a position-sensitive diode or lateral diode). This enables continuous, or quasi-continuous, control of the rearmost mirror during a switching process, in particular in an analog control loop, for example through digital iteration. Deviations of the light beam from the direct switching path can be identified and compensated with minimal response time. A PSD with an isotropic light-sensitive surface and continuous position information is described for example in WO 01/93340 A1, the disclosure of which is incorporated herein.

Preferably, also, the capturing mirror has a drive to rotate it about its rotational axis, and is connected to a control unit controlling the adjustment of the capturing mirror as a function of a signal from the front detector. Thus the orientation of the foremost mirror by means of the front detector does not need to be performed manually. Thus constant changes, for example due to thermal expansion, may be continuously compensated. Continuous pre-compensation is possible with an analog control loop, while at least quasi-continuous pre-compensation is possible with a digital control loop, as the primary thermally-induced changes take place slowly. The control of the capturing mirror may advantageously be carried out independently of the adjustment of the switching mirror and/or independently of all position information output from the back detector, so that the capturing mirror and switching mirror have independent control loops. This allows for a compensation of changes in the beam paths with minimum response time and high accuracy.

Particularly preferred are those embodiments in which the capturing mirror has a spatially fixed point of rotation that preferably lies on its mirror surface, in particular with a micro-electro-mechanical drive. This avoids impressing the light beam with additional spatial and angular errors dependent on the rotational position of the rearmost mirror. This enables maximum deflection accuracy and switching speed.

Optimal pre-compensation may be achieved when an optical path from the front beam splitter to the front detector is identical, or at least approximately identical, to an optical path from the front beam splitter to the switching mirror (in particular to the pivot point of the switching mirror). The rearmost mirror then communicates optically with the detector via the front beam splitter, so that a deviation of the light beam from a target position to the rearmost mirror may be detected with high accuracy and speed. Preferably, the front detector has an isotropic light-sensitive surface, and outputs position information as a continuous signal (PSD in the strictest sense). Alternatively, it may be in the form of a quadrant detector, in particular a quadrant diode.

Preferably, the input and/or output points in the form of respective optical interfaces, especially as respective fiber couplers or another optical elements, in particular with collimation optics at the input point and respective coupling optics at each output point. The (laser) light beam to be deflected and/or stabilized in the region of the optical switch may be collimated through the collimation optics and coupling optics, which simplifies the optical design of the optical switch and minimizes transmission errors. However, an infinite beam may also be produced outside the optical switch, i.e. upstream of the input point and downstream of the output points.

Useful embodiments are those in which the mirrors, the beam splitter and the detectors are arranged on a monolithic block in the form of a common mechanical support, in particular with the formation of the output points as fiber couplers, and the arrangement of the fiber couplers on the monolithic block. In this way, the influences of thermal changes and external vibrations may be reduced. In addition, compared to conventional arrangements, a significantly reduced size and modular design may be obtained.

The invention also comprises a coupling module with an optical switch in any of the forms described previously and, in addition, a number of fiber couplers as module inputs as well as a cascade of the same number of beam combiners for the coaxial combination of the input light beams output from the fiber couplers into a common beam of light, which runs to the capturing mirror via the input point of the optical switch, and to each fiber coupler as a module output, in particular with respective collimation optics at each module input and respective coupling optics at each module output.

The fiber couplers to the module inputs are each directed to one of the beam combiners. The input point of the optical switch may, in this case, be a point on an optical link, especially a free beam, and in particular on an optical link between the last beam combiner of the cascade and the capturing mirror of the optical switch. In particular, the last beam combiner of the cascade may represent the input point of the optical switch. The input points may be respective points on an optical link, especially a free beam, between the switching mirror to the optical switch and the fiber coupler to the module output in question. In particular, each individual fiber coupler may represent the input point in question itself. The beam combiners are preferably dichroic mirrors that are reflective at the wavelengths of the remaining light beams and transparent for the relevant wavelengths of the other light beams. The first beam combiner of the cascade may also be a mirror. Suitable devices with fiber couplers and beam combiners are known, for example, from WO 2009/012 846 A1, whose disclosure is incorporated herein by reference. Alternatively, or in addition to the mechanical coupling to the optical switch, the beam combiner cascade may be coupled to the input point of the optical switch by means of one or more optical waveguides.

Particularly preferred are those embodiments in which an acousto-optical element is arranged in the common beam path between the last beam combiner and the capturing mirror of the optical switch, which may in particular be fiber-optically coupled to the beam combiner cascade and/or the optical switch. This makes it possible to omit separate acousto-optical elements for the individual input light beams, whether they are inside or outside the coupling module. Alternatively or additionally, an acousto-optical element may be arranged in each case between a module and the corresponding input beam combiner for one, several or all of the module inputs. Acousto-optical elements may be used for intensity modulation. In particular, the various input light beams may be selectively diffracted individually or in groups and are thus allowed to pass via the switching mirror and the capturing mirror to the selected output module.

It is advantageous if the cascade comprises an additional beam combiner with an additional fiber coupler arranged on it, or a pilot laser that is arranged on it, whereby the additional beam combiner and/or the additional fiber coupler or the pilot laser are so arranged that a light beam exiting from the additional fiber coupler or the pilot laser enters the acousto-optical element that is positioned in the common beam path, as a pilot beam at a different angle to that of the common beam, in particular so that it is deflected geometrically-optically in the direction of a diffraction order of a wavelength of the common light beam, and exits from the acousto-optical element collinearly with the selectively diffracted input light beams, but preferably not diffracted. In the case of fiber optic coupling of the acousto-optical element and the beam combiner cascade and the optical switch, the additional beam combiner may instead be so arranged that the pilot light beam is coupled coaxially into the common beam. The pilot light beam may be used for more precise control of the mirror positions of the optical switch. Its emission preferably lies outside the range of useful wavelengths. For example, useful wavelengths may lie from 400 nm to 650 nm, between 780 to 830 nm.

In principle, it is in fact possible to use a useful wavelength switched between the output points for control if this is not pulsed, i.e. permanently has a an intensity different from zero at the respective output. However, fluctuations in intensity may occur at the detectors in the form of undesired behavior, or even the failure of one or both control loops (over-control or under-control of the detector). In particular, this applies to pulsed laser light sources (FLIM, PLIM). Preferably, therefore, the wavelength of the pilot light beam lies above the wavelength range of the useful wavelengths. Insofar as the back beam splitter is designed as a color splitter with a spectral edge lying between the useful wavelengths and the pilot wavelengths, the pilot beam may then be decoupled entirely, or at least almost entirely, at the back detector, so that it does not reach any of the outputs.

Advantageously, the coupling module may be configured so that the back beam splitter and the front beam splitter of the optical switch are transparent or at least substantially transparent to wavelengths smaller than that of the pilot laser, whereby the back beam splitter decouples the wavelength of the pilot laser at the rear detector partially or completely, and whereby the front beam splitter only partially decouples the wavelength of the pilot laser at the front detector. It is advantageous if the same power density is present (power/area) at the two detectors. This can be achieved, for example, with a power-adjustable pilot laser by means of exchangeable neutral density filters in front of the two detectors.

Preferably, the coupling module has collimation optics, which define a beam waist diameter at the switching mirror of the optical switch, and reflect this beam waist in association with optics upstream of the back detector that have an imaging ratio of 1:1 at the back detector of the optical switch.

The invention also includes a microscope with an optical switch in any of the forms described above, and a plurality of lasers as well as a cascade of a plurality of beam combiners to combine the laser beams to form a common beam of light which passes through the input point of the optical switch to the capturing mirror, in particular with optics to generate an infinitely-focused beam in the region of the optical switch or a collimation, which is optimized for re-coupling into single-mode fibers at the outputs of the optical switch in conjunction with the focal lengths of coupling optics used in the optical switch, or with a coupling module in one of the previously described forms, to which fiber coupler at least one laser is connected via optical waveguides. One of the output points of the optical switch is then suitably optically connected to an illumination beam path of the microscope, in the case of the coupling module via the fiber coupler. Other microscopes or other inputs of the first microscope may be connected to the other output points.

Particularly preferred are those embodiments comprising an acousto-optical element in the common beam section and a pilot laser, whose light beam enters the acousto-optical element (by a suitable arrangement of the pilot laser or a corresponding coupling in the acoustic optical element) at an angle other than that of the common light beam of the other laser, whereby the pilot laser preferably emits a wavelength that is above the range of the maximum useful wavelengths used, and whereby it enters the acousto-optical element and is geometrically-optically split so that it exits in the direction of, or collinear with, a diffraction order of the diffracted common light beam section.

Advantageously, the microscope may be so formed that the back beam splitter and the front beam splitter of the optical switch are transparent or at least substantially transparent for wavelengths smaller than that of the pilot laser, whereby the back beam splitter partially or completely decouples the wavelength of the pilot laser at the back detector, while the front beam splitter only partially decouples the wavelength of the pilot laser at the front detector. This enables maximum transfer efficiency for useful wavelengths. In addition, band elimination filters for the wavelength of the pilot laser beam may be arranged at the module outputs in the region of the output points and/or upstream of the fiber couplers. Advantageously, band elimination filters may be arranged in front of the back detector and the front detector for useful wavelengths, for example in the form of a spectral band pass filter for the wavelength of the pilot laser beam.

The invention enables, in particular, the combination of methods such as light-sheet fluorescence microscopy (LSFM or SPIM) or high-resolution microscopy (PALM, Storm, SIM) beyond the diffraction limit using the above TIRF, FRAP and confocal scanning methods in arbitrary permutations. Generally speaking, the optical waveguides to be connected to the input and output points are preferably polarization-maintaining single-mode fibers, but can also be multi-mode fibers, for example in connection with FRAP applications.

The optical switches and beam stabilization devices according to the invention may be used in the optical devices both on the excitation side as well as the detection side.

BRIEF DESCRIPTION OF THE DRAWINGS

The invention will be explained in more detail with reference to embodiments.

In the drawings.

DESCRIPTION OF THE EMBODIMENTS

Figure 1:
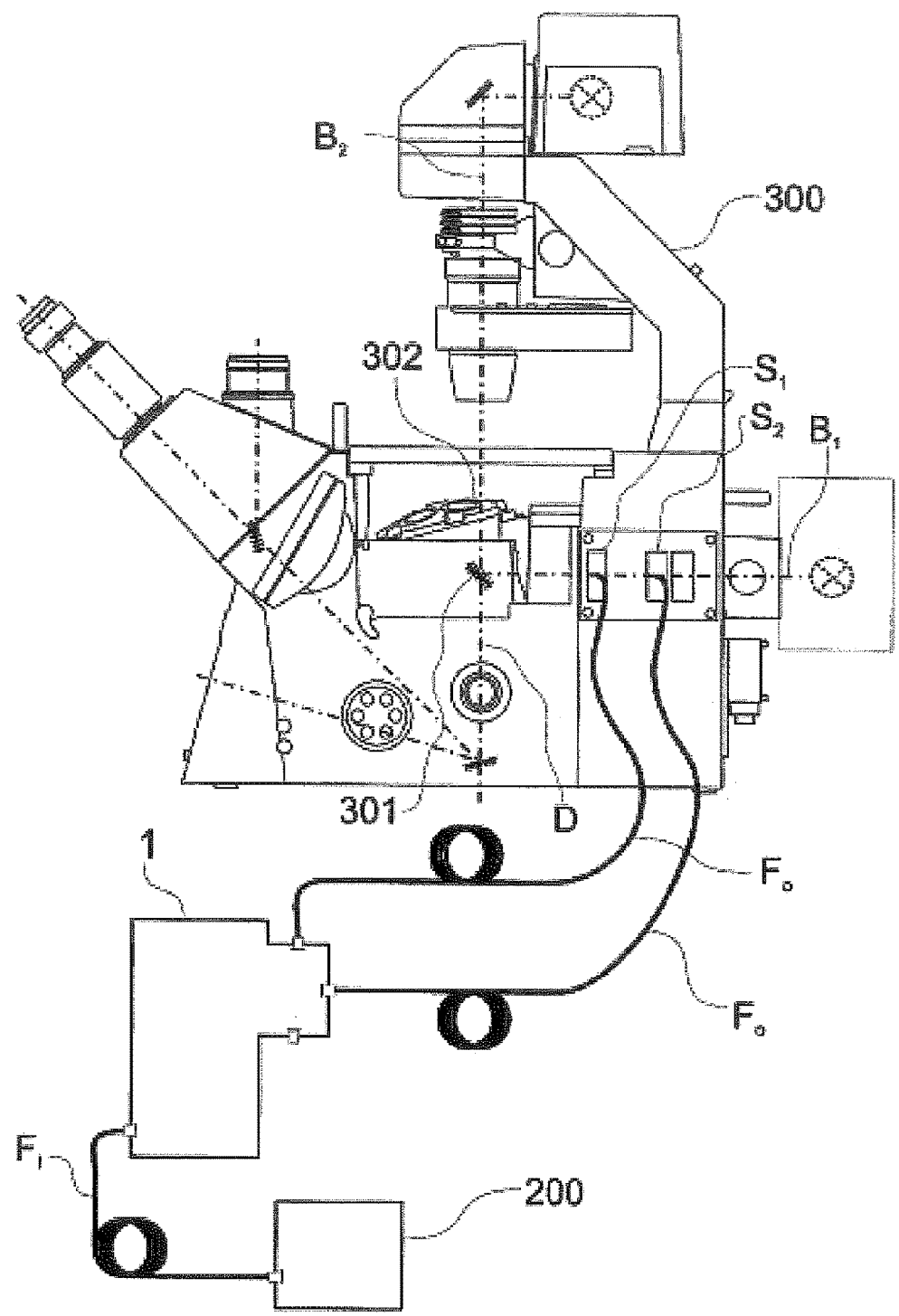
FIG. 1 shows a multi-purpose microscope with light source and optical switch.

In all the drawings, the corresponding parts bear the same reference numerals.

FIG. 1 shows a schematic representation of an optical switch 1 connecting a light source in the form of a laser module 200 having different inputs of a microscope 300. The laser module 200 is connected via an optical waveguide $F_I$ with the optical switch 1. From the outputs, for example, a first light waveguide $F_o$ leads to a first gate $S_1$ of the microscope 300 that is adapted for TIRF illumination, and a second light waveguide $F_o$ leads to a second gate $S_2$ of the microscope 300 that is designed for FRAP illumination. A third optical waveguide (not shown for clarity) leads to a confocal illumination and detection unit of the Nipkow disc (not shown). The two gates $S_1$ and $S_2$ are arranged in a reflected light illumination path $B_1$, which is coupled with the detection beam path D through a beam splitter 301, and thus passes with it through the optics 302. The microscope 300 also has a transmitted light illumination beam $B_2$. The optical switch 1 allows switching between FRAP illumination and TIRF illumination with a delay less than 2 ms. This allows pre-defined sequences of illumination to be switched, such as TIRF image acquisition, bleaching and repeated TIRF image acquisition for observation of diffusion processes.

Figure 2:
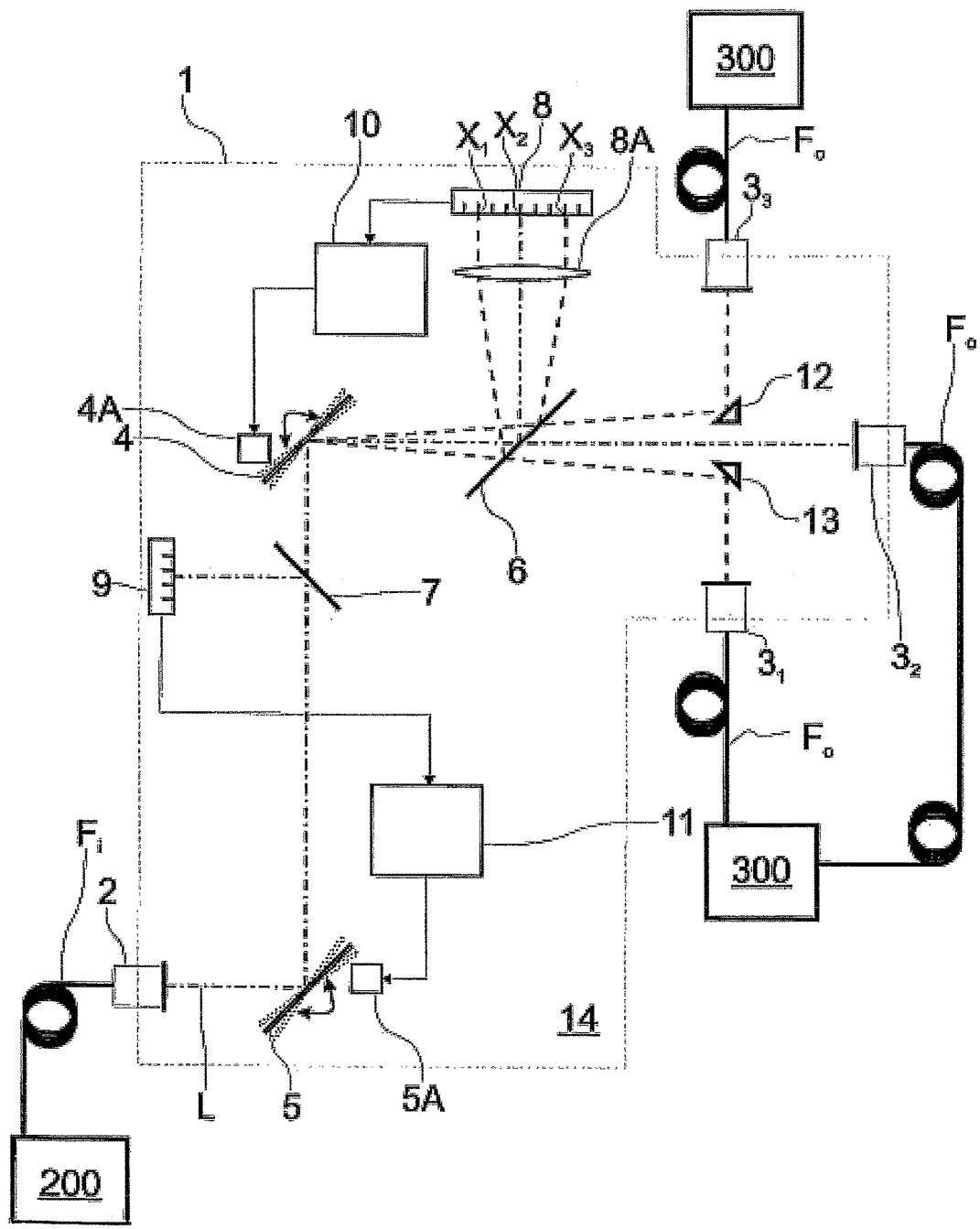
FIG. 2 shows an optical switch with three output points.

FIG. 2 shows a schematic representation of an optical switch 1 at an input point 2, output points $3_i$ (in this case three: i=1, 2, 3), two mirrors 4 and 5 rotatable about two different axes, two beam splitters 6 and 7, two position-sensitive detectors 8 and 9, two control units 10 and 11, as well as an example of two mirrored reflecting prisms 12 and 13. All these components are attached to a common mechanical support, which is, for example, in the form of a monolithic block 14 made of tempered aluminum. This makes it possible to design the entire block 14 as a mechanical interface for servicing purposes. This reduces costs and facilitates modular manufacturing of optical devices.

The input point 2, for example, is in the form of a fiber coupler for external connection to a light source (not shown) via an optical fiber $F_I$ and includes, for example, a collimation optics (not shown separately). The three output points 3 are designed, for example, as fiber couplers for external connection of a microscope (not shown) via optical fiber $F_o$, and includes for example coupling optics (not shown separately).

Both mirrors 4, 5 have, for example a spatially-fixed pivot point located on the mirror surface. The actuators 4A and 5A of the two mirrors have, for example, MEMS-based electrostatic actuators. Each of the mirrors 4, 5 and its drive 4A, 5A may be mounted on a respective ceramic carrier, which is inserted on a circuit board similar to an IC chip. Thus, a simple mechanical screw connection with the block is possible via the printed circuit board. The capturing mirror 5 has, for example, a square reflective surface with an edge length of 4 mm. The switching mirror 4 has, for example, a square reflecting surface with an edge length of 2 mm. The capturing mirror 4 may be designed as both slow (resonant frequency below 500 Hz), and fast (resonance frequency over 1 kHz). To achieve as short a switching time as possible, the first resonance should preferably be at least 2 kHz.

The drive 4A of the switching mirror 4, for example, is electrically (alternatively wirelessly) connected to the first control unit 10. The drive 5A of the capturing mirror 5, for example, is electrically (alternatively wirelessly) connected to the second control unit 11. The first control unit 10 is, for example, electrically (alternatively wirelessly) connected to the back detector 8, which is optically connected with the switching mirror 4 via the back beam splitter 6. The second control unit 11 is, for example, electrically (alternatively wirelessly) connected to the front detector 9, which is optically connected with the capturing mirror 5 via the front beam splitter 7.

The prisms 12, 13 are so arranged that light is deflected from the direction of the switching mirror 4 from the first prism 12 to the first output point 3, and from the second prism 13 to the third output point 3. Light from the direction of the switching mirror 4 that passes between the two prisms 12 and 13 reaches the second output point 3 without further deflection. Compared to a straight-line propagation from the switching mirror 4 to the output points 3, the prisms 12 and 13 allow a stronger spatial separation of the output points 3 from one another with a minimal deflection angle of the switching mirror thus allowing fast switching movements. In addition, this results in more mechanically favorable conditions for mounting the fiber coupling.

A light beam L entering the input point 2 is incident first of all to the capturing mirror 5. The latter is so adjustable that it reflects the light beam L on the switching mirror 4, and in particular on its pivot point, and thereby directs the beam through the front beam splitter 7. The switching mirror 5 is adjustable so that it may reflect the light beam L coming from the capturing mirror 5 incident to its pivot point or, alternatively, to one of the output points 3 where appropriate, via one of the prisms 12 or 13, and thereby guides it through the back beam splitter 6. The adjustment of the mirrors 4 and 5 is effected via their drives 4A and 5A.

Optionally, the input optics 8A of the back detector 8 are about the same distance from the back beam splitter 6 as from each of the output points 3. The output points 3 thus communicate with the back detector 8 via the back beam splitter 6. The front detector 9 is about the same distance from the front beam splitter 7 (more specifically from the position of the beam splitter at which the line connecting the pivot points of the two mirrors 4, 5 cuts it) as from the switching mirror 4 (more precisely, the pivot point). A point on the front detector 8 thus communicates with a respective point on the switching mirror 4.

The back detector 8 is preferably a PSD with an isotropic light-sensitive surface and emits continuous position information to the first control unit 10. With the back detector 8, the first control unit 10 forms a control loop to adjust the actuator 4A of the switching mirror 4, which compensates for any deviation of the light beam L from a predetermined target position $X_i$ on the light-sensitive surface of the back detector 4 by an opposite tilting of the switching mirror 4. The control is preferably carried out through continuous feedback. For example, the momentary actual position of the switching mirror 4a is iteratively determined through an FPGA serving as a digital processor having an exemplary repetition frequency of 1 MHz, and that determines and outputs a control parameter on the basis of the momentarily set target position $X_i$ of a look-up table, for example an electric voltage identifying the mirror position for the drive 4A. For example, multiple lookup tables (LUT) are saved in the first control unit 10, respectively one for each output point 3, and thus for each possible target position $X_i$. The required change of the control voltage for the mirror drive 4A as a function of the impact point of the back beam splitter section of the light beam L on the photosensitive surface of the back detector 8 is stored in each LUT for the proper irradiation of the relevant output point 3, for example, at a resolution of 64×128 grid points between which the processor is linearly interpolated. The selection of one of the output points and the specification at the control unit 10 then takes place by selection of the relevant LUT, for example, by a user at a user interface, which outputs the selection to the control unit 10. The control unit accepts the new selection and necessarily determines the deviation from the correct beam position at the detector 8 due to the change. It picks out a value from the selected LUT for a change in the control voltage based on the current beam position at the detector 8 and outputs it to the drive 4A.

The said front detector 9 is, for example, like the back detector, an isotropic PSD that is so arranged that the pivot point of the capturing mirror 5 communicates firstly with its center via the front beam splitter 7, and secondly with the pivot point of the switching mirror 4. The second control unit 11 forms a control loop with the front detector 9 to adjust the drive 5A of the capturing mirror 5, which, like the control loop of the switching mirror 4, compensates for any deviation of the de-coupled part of the light beam L at the front beam splitter from the center of the front detector 9 by an opposite tilting of the capturing mirror 5. The degree of the tilting of the capturing mirror, for example, depends on the distance of the momentary impact position at the detector 9 from its center.

The two control loops are implemented independently of one another. In an alternative embodiment (not shown), the capturing mirror 5 may be adjusted manually, so that the control loop, and thus the second control unit 11 may be omitted. The drive 5A may be omitted in the case of manual adjustment. As an alternative to the manual adjustment, a piezoelectric or motor-driven adjustment is possible. The manual adjustment is effected via the drive 5A. Position stabilization is possible by means of back illumination and detection as described in US 2012/0300197 A1. In any event, the front detector 9 and the front beam splitter 7 are useful but not essential to effect precise manual adjustment. This then eliminates the need for permanent automatic tracking of the capturing mirror 5, and thus the automatic correction of position changes and angular changes of the useful light incident to the optical switch 1. The light beam to be deflected is then no longer automatically centered on the switching mirror with its systemic limited aperture.

A total switching time of less than 2 ms as a result of fast, accurate switching between two fiber outputs 3 is achieved through the two successively arranged switchable mirrors 4, 5, which are stabilized by two independent control loops 8/10/4A and 9/11/5A that are separate from one another, and thus offer fast, accurate beam positioning and tracking in the smallest angular segments. A switching time of 1.6 ms has been reached in experiments. Fast, accurate switching is possible even with only one loop 8/10/4A.

As an exemplary light source, a laser module 200, which outputs a plurality of coaxially superimposed laser beams via acousto-optic tunable filters (AOTF) (not shown) for intensity modulation, is connected to the input point 2. As exemplary target devices, a first microscope 300 is connected to the first output point 31 and to the second output point 32, and a second microscope 300 to the third output point 33.

In other embodiments (not shown), the position of a mirror 4 or 5 may be determined and stabilized by back lighting and detection as disclosed in US 2012/0300197 A1. This may happen, for example in a subordinate control loop within the relevant drive 4A or 5A. The respective superordinate control loop along with the control unit 10 or 11 can then specify the (relative) position as the reference variable to the subordinate control loop.

Figure 3:
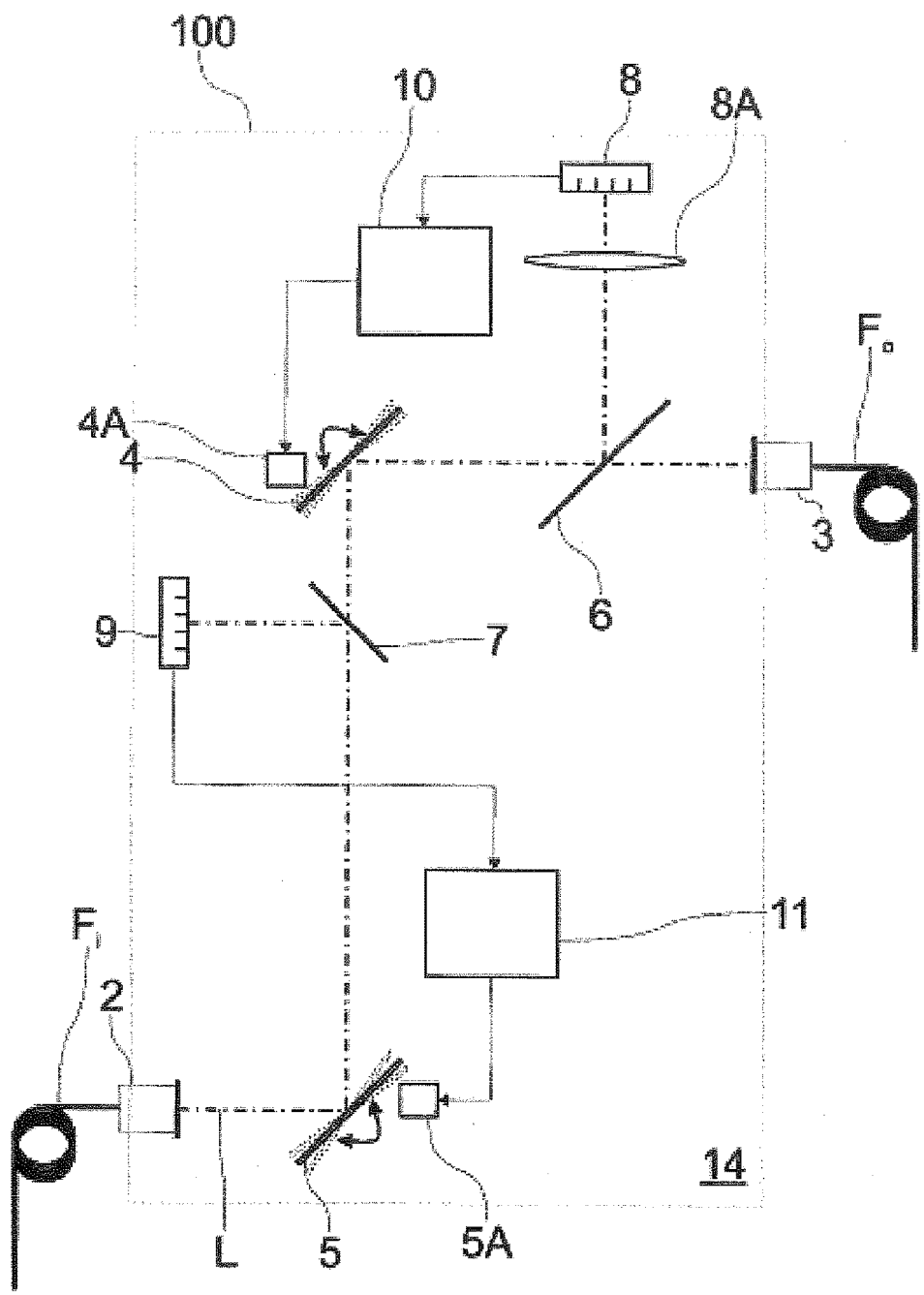
FIG. 3 shows a device for stabilizing a light beam coming from an input point in the direction of an output point.

In FIG. 3 is shown schematically an apparatus 100 for stabilizing a light beam L from the direction of an input point 2 towards an output point 3, which is identical with the light switch 1 of FIG. 1, except for the number of output points 3.

Figure 4:
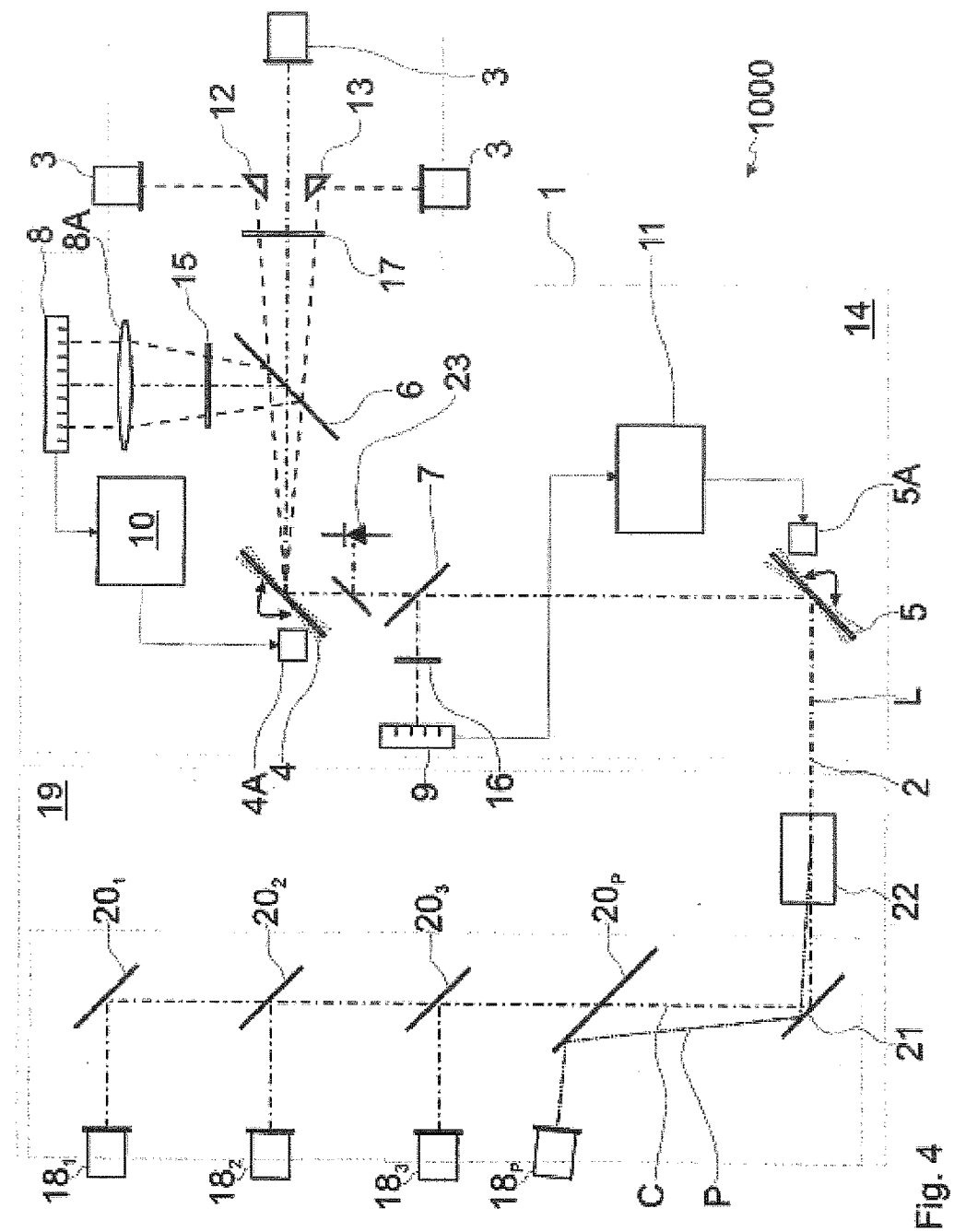
FIG. 4 shows a coupling module with an optical switch.

FIG. 4 shows a schematic representation of a coupling module 1000 comprising a beam combiner module on a support 19 and an optical switch 1 on the support 14, which are coupled mechanically and optically. The beam combiner module is designed according to WO 2009/012 846 A1, and includes a cascade of, for example, three beam combiners $20_q$ (q=1, 2, 3) with associated module inputs $18_q$, for example in the form of fiber couplers for optical waveguides, and an additional beam combiner $20_p$ with an associated additional input $18_p$ for coupling a pilot laser, as well as an acousto-optical element 22, such as an AOTF. The beam combiner module and the optical switch 1 are coupled to the output of the beam combiner module (the output of the acousto-optical element 22) forms the input point of the light switch 1.

Laser beams occurring at the inputs $18_q$ are merged by the beam combiner cascade $20_{1-3}$ into a common light beam C. To this end, the beam combiners $20_q$ are designed, for example, as a dichroic mirror, which reflects the wavelengths of the respective associated input of the incident light beam (spectral band-stop filter, for example in the form of a notch filter), while allowing other wavelengths, especially the light beams coupled at the other inputs, to pass through.

The additional input $18_p$ and the additional beam combiner $20_p$ are so arranged (for example, tilted with respect to the other inputs $18_q$) that a pilot light beam P entering this input at a different angle enters the acousto-optical element 22 as the common beam C. In alternative embodiments (not shown), the additional input $18_p$ may be omitted. A pilot light beam P may then be coupled via one of the other inputs $18_q$, for example, so that it is combined with the other laser beams in the common light beam C. The pilot laser (not shown) may be arranged in every case, for example, on the support 14 and connected via an optical fiber to the additional input $18_p$ or to one of the regular inputs $18_q$. Alternatively, the additional input $18_p$ may be replaced by a correspondingly aligned pilot laser (not shown). In a further alternative, the pilot laser between the acousto-optical element 22 and the capturing mirror may be coupled coaxially into the light beam L. The pilot laser preferably emits a wavelength such as 785 nm, which is above the longest usable wavelength used, for example, 650 nm, and within the spectral transmission window of the anti-reflective coated AOTF crystal.

Figure 5:
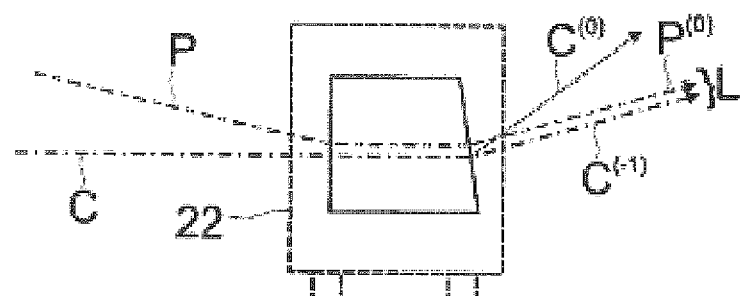
FIG. 5 shows the coupling of a pilot light beam in a common light beam in an acousto-optical element.

FIG. 5 illustrates the optical paths in the AOTF 22. The processing of the pilot beam P is obtained by coupling at a different angle. This is so selected that the pilot beam P is geometrically-optically refracted at the AOTF crystal and thus outputs from the AOTF in the same direction as the −1. The diffraction order of the common light beam C is denoted by $C^{(-1)}$. The non-deflected portions of the common light beam C (dependent on the activation of the AOTF) appear as zero diffraction order of $C^{(0)}$ and reach a known light trap (not shown).

Referring again to FIG. 3, the acousto-optical element 22 is used for modulation or suppression of individual wavelengths. Wavelengths that should not reach one of the outputs 3 enter the light trap—with the exception of the pilot beam P—by appropriate electrical control of the AOTF of the acousto-optical element 22, so they do not become part of the resulting light beam L. The remaining wavelengths—including the pilot beam P—reach the capturing mirror 5 as the light beam L via the input point 2 of the optical switch 1. From thereon the further course corresponds to the one shown in FIG. 1, whereby exemplary additional filters 15, 16 and 17 are arranged in the beam path, and a portion of the light beam L is coupled to a monitor diode 23. The first filter 15 upstream of the back detector 8 is, for example, a spectral band pass that only lets wavelengths of the pilot beam P pass and serves as a neutral density filter to reduce the light intensity in order to prevent overloading of the detector 8. The second filter 16 upstream of the front detector 9 is, for example, an identical spectral band pass that only lets the wavelength of the pilot beam P pass. In addition, a neutral density filter is integrated in order to avoid overloading the detector 9. The third filter 17 is, for example, a notch filter in the form of a spectral band-stop exclusively for the wavelength(s) of the pilot beam P.

With respect to a coupling of the pilot laser between the AOTF 22 and the optical switch 1, the arrangement illustrated has the advantage that the pilot beam P works in the same mechanical system as the remaining beams C and, corresponding to changes in position undergoes the same changes, so that a more accurate compensation of changes is possible. Basically, a stable overlay of useful and pilot lasers is necessary for stable operation. A further advantage is that any deviation between the useful and pilot lasers through a re-determination of the reference position of the individual outputs at the back detector 9 may be adjusted automatically in the system within certain limits.

The advantage of the beam combiner module consists in the fact that the pilot laser P may be replaced without adjustment, exactly like any useful lasers while retaining the functionality of the system via a high-precision connector at the fiber output to the mirror grid. The accuracy should be sufficiently high so that no effect occurs on the fiber coupling at the output of the module, and that it moves ideally in the range of less than 10 µm in position and less than 10 µrad in angle. Within certain limits, errors in beam position and beam direction occurring between useful and pilot lasers in the course of operation may be compensated for by recalibration of the respective target position at the back detector 9 for the individual module outputs 3. A further advantage of the fiber-coupled laser is the possibility of physical separation of the laser unit from the beam combining/modulation and beam switching.

The monitor diode 23 in the space between the two mirrors 4 and 5 may be used for automatic calibration of the AOTF 22 and the possible construction of a feedback loop with an additional detector at a module output 3, which in turn is advantageously plugged into the housing of the module 1000, whereby no additional measuring instruments are necessary. Thus, it is possible, for example via a suitable algorithm, to optimize the beam position and beam direction via the mirror angle with respect to the fiber core at the module outputs 3 and via the maximum coupling efficiency, and to determine the correspondingly corrected reference positions $X_i$ for each output of the back detector 9, which are then retrievable via the LUT of the first control unit 10. The additional detector at the relevant module output 3 may ideally be arranged directly in an imaging module connected to an optical waveguide so that repositioning of the optical waveguide is not needed. Another possibility is the integration of the detector directly in the fiber connector to the module output 3, for example, by selective decoupling of radiation in the fiber sheath.

In alternative embodiments (not shown), the momentary position of the mirror 4 or 5 is determined by rear-side detection. In this way, the relevant mirror is irradiated with light, for example a laser, from the rear side and at a certain angle and by using the reflected light, the mirror position may be detected as a function of the angle. The momentary position may be used in the control unit 10 or 11 of the respective control loop for more accurate control of the respective drive 4A or 5A.

Figure 6:
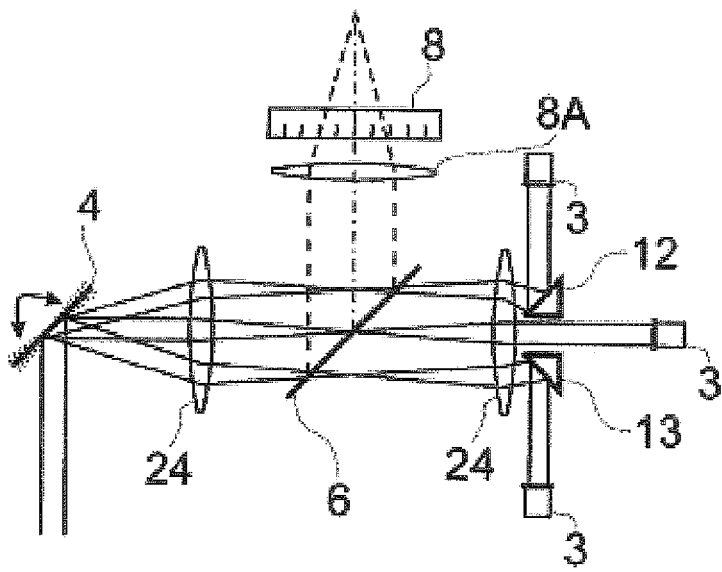
FIG. 6 shows a first 4f arrangement in an optical switch.
Figure 7:
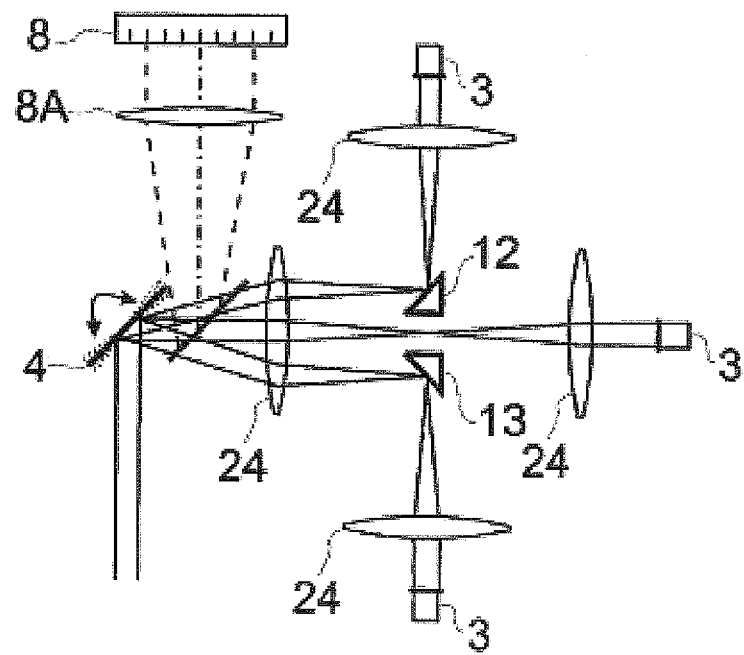
FIG. 7 shows a second 4f arrangement in an optical switch.

Advantageous extensions of the optical switch 1 are illustrated in FIGS. 6 and 7. These figures show variants of a known 4f arrangement between the switching mirror 4 and the output points 3 through appropriate optics 24. Ideally, these may be a 1:1 telescope, so that the switching mirror 4 is directly imaged at the output points 3, or more precisely, at the respective coupling optics. This makes the system as a whole less sensitive to changes in the beam position resulting in reduced angular sensitivity.

Figure 8:
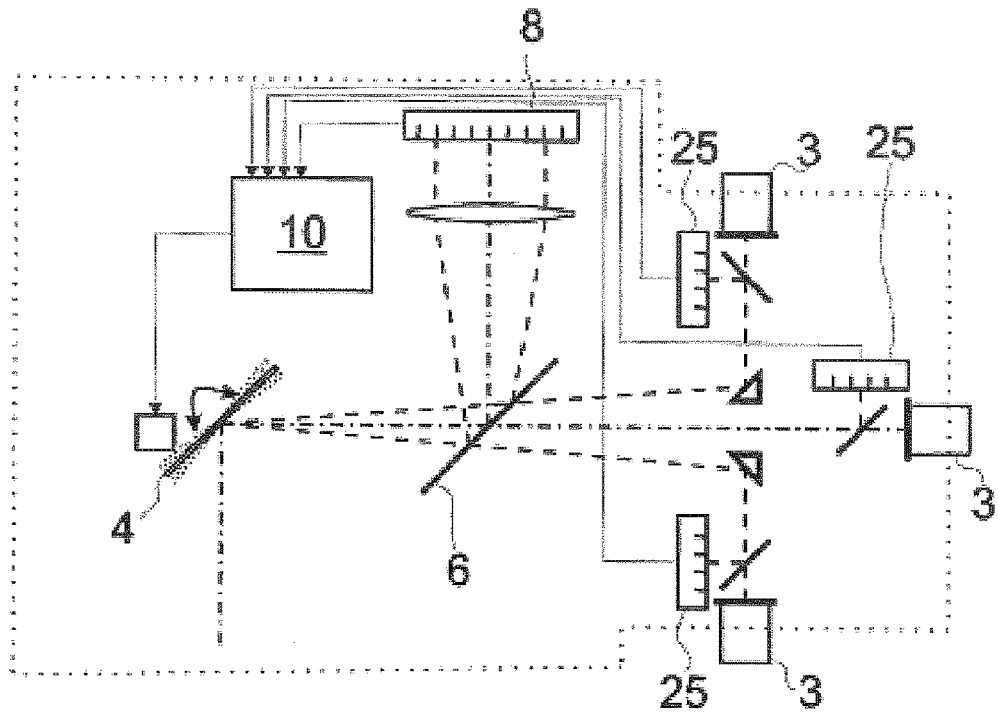
FIG. 8 shows an alternative optical switch.
Figure 9:
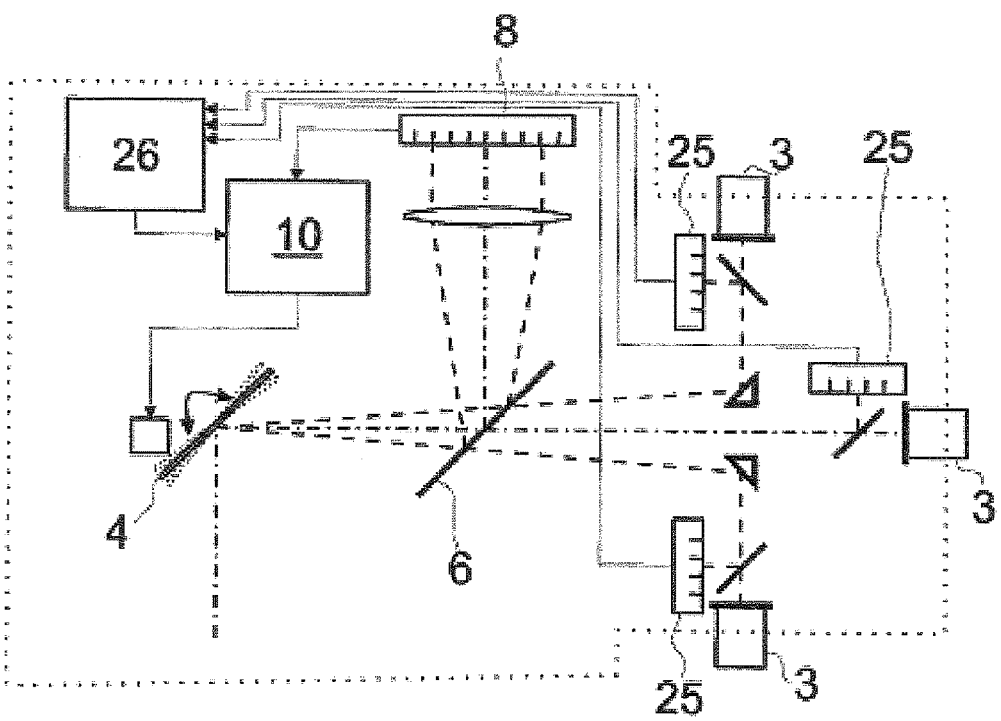
FIG. 9 shows a further alternative optical switch with cascaded control.

FIGS. 8 and 9 show schematically sections of alternative optical switches 1, where each output part 3, in this case in the form of a respective fiber coupler, is associated with a separate position detector. For this purpose, a respective auxiliary detector 25 in the form of a PSD is integrated in the immediate vicinity of the respective fiber coupling by a respective beam splitter, whereby the PSDs together cover the entire possible angular range of the maximum deflection of the switching mirror 4. In this way, the stability of the positioning of the beam L with respect to the fiber coupler 3 can be further increased. The controlled switching of the light beam L between the output points 3 can then, for example, be effected as in FIG. 8 by means of an additional, outer control loop with an external control unit 26, which monitors the long-term stable positioning of the fiber coupling and operates the inner loop of the first control unit 10, which is significantly faster and uses the signals of the common measuring system from the back detector 8 and auxiliary detectors 25. Alternatively, as shown in FIG. 7, the first control unit 10 may be so formed that, in principle, it provides the control loop according to FIG. 1, which is used exclusively to control the signal of the back detector 8, but can be changed to a calibration mode as required by a user, and in which the signals of the additional detectors 25 are used. In such a calibration mode, for example, the look-up tables of the first control unit 10 can be determined.

Figure 10A:
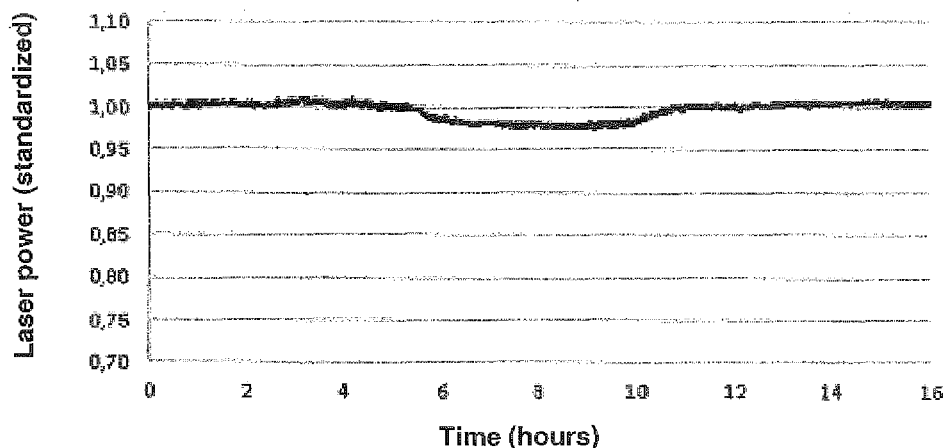
FIGS. 10A and 10B show the results of long-term performance measurement under temperature variations.
Figure 10B:
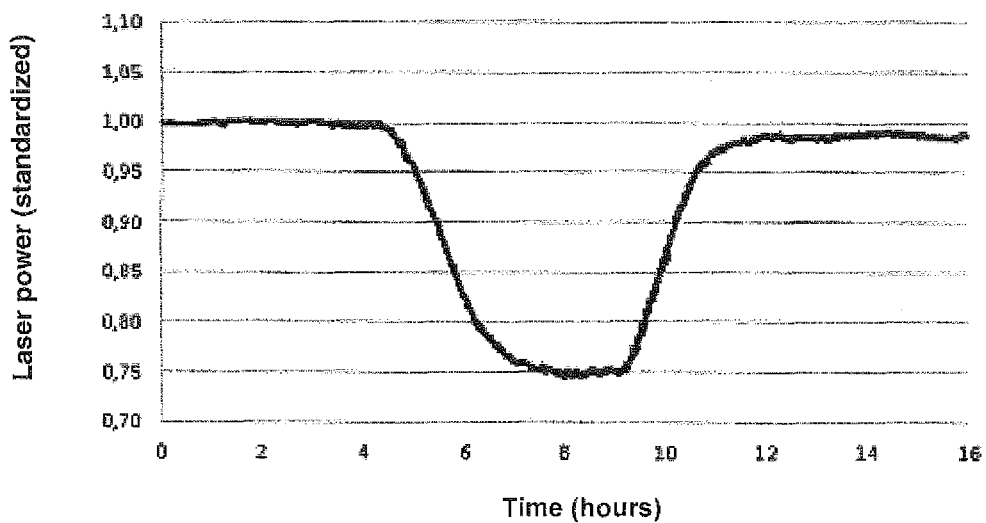

In FIGS. 10A and 10B laser powers effectively coupled into an output fiber are shown under temperature fluctuations as measured over 16 hours (without intermediate switching). In the measurement of the values shown in FIG. 10A, both control circuits were activated, while in FIG. 10B they were deactivated. The drop in performance at the start of the temperature increase after four hours is clearly visible.

In alternative embodiments (not shown), the optical switch 1 and the coupling module have more than 3 output points. These may in particular be arranged in a star shape.

It may be advantageous, during a switching process at the switching mirror 4, to perform a wavelength and/or intensity modulation at the AOTF 22 (or at the individual acousto-optical elements associated with the module inputs 19 or directly modulated laser diodes). The pilot laser, meanwhile, will continue to operate constantly.

The look-up tables of the back detector may be determined, for example, as part of a calibration measurement by scanning the back detector 8 by means of the switching mirror 4. In this way, mirror drive voltage location information signal value pairs may be determined, for example, in an isotropic PSD. Previously, preferably the dark current of the PSD is determined and the pilot laser is set to a PSD sum signal of 80%.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

LIST OF REFERENCE NUMERALS

1 Optical switch
2 Input point
3 Output point
4 Switching mirror
4A Drive
5 Capturing mirror
5A Drive
6 Back beam splitter
7 Front beam splitter
8 Back detector
8A Detector optics
9 Front detector
10 First control unit
11 Second control unit
12 First deflection prism
13 Second deflection prism
14 Monolithic block
15 First filter
16 Second filter
17 Third filter
18 Module input
19 Support
20 Beam combiner
21 Mirror
22 Acousto-optical element
23 Monitor diode
24 4f optics
25 Additional detector
26 External control unit

What is claimed is:

1. An optical system comprising: a source of light, different optical measuring instruments, each measuring instrument having at least one input, or a multi-function measuring instrument having multiple different inputs, an optical switch having a single input point optically connected with said light source for receiving said light, said optical switch configured for adjustably deflecting a light beam from the direction of said input point in the direction of one of a plurality of predetermined separate output points, each output point being optically connected to one of said inputs, said optical switch having a rotatable switching mirror, said switching mirror having a single input point and a plurality of predetermined separate output points, said switching mirror configured to deflect said light beam from the direction of said input point in the direction of at least one of said predetermined separate output points and having a micro-electromechanical actuator and a control unit for adjusting said switching mirror, a rotatable capturing mirror, front and back beam splitters, and front and rear spatially-resolving detectors, said switching and capturing mirrors being rotatable about two respective axes, said front beam splitter arranged for partial coupling of said light beam optically between the capturing mirror and the switching mirror at said front detector, said back beam splitter arranged for partial decoupling of the light beam optically between the switching mirror and each of said predetermined separate output points at said back detector, and said control unit being arranged to control a drive of said switching mirror on the basis of a signal from said back detector.

2. The optical system according to claim 1, wherein said switching mirror is smaller than said capturing mirror.

3. The optical system according to claim 1, wherein said back detector is so arranged that for each of the predetermined separate output points of the back beam splitter, a de-coupled portion of the light beam, which is respectively reflected in the direction of a respective output station from the switching mirror, is incident over its entire cross-section to a light-sensitive surface of said back detector.

4. The optical system according to claim 1, wherein said capturing mirror is so arranged and rotatable, that it reflects the light beam coming from the input point to the switching mirror, said switching mirrors being so arranged and rotatable to different positions that it reflects a light beam reflected from said capturing mirror to one of said predetermined separate output points.

5. The optical system according to claim 1, wherein said control unit of said switching mirror performs control independently of adjustment of said capturing mirror and independently of all position information output from said front detector.

6. The optical system according to claim 1, wherein said switching mirror has a spatially-fixed point of rotation lying on a mirror surface of the switching mirror.

7. The optical system according to claim 1, wherein an optical path from the back beam splitter to the back detector is identical to an optical path from the back beam splitter to each of the predetermined separate output points.

8. The optical system according to claim 1, wherein said control unit of the switching mirror is arranged to determine values for a control parameter for driving of the switching mirror so that a position of the switching mirror approaches a reference value with monotonically decreasing amplitude, and with monotonically decreasing speed, in order to control the drive.

9. The optical system according to claim 8, wherein said control unit comprises a digital processor and a memory with a look-up table for the control parameter as a function of a momentary beam position at the back detector, and as a function of a predetermined deflection direction, in the form of a reference position on the back detector.

10. The optical system according to claim 9, wherein a repetition frequency for the adjustment of the switching mirror is greater than 100 MHz.

11. The optical system according to claim 9, wherein a repetition frequency for the adjustment of the switching mirror is greater than 500 MHz.

12. The optical system according to claim 9, wherein a repetition frequency for the adjustment of the switching mirror is at least 1 MHz.

13. The optical system according to claim 1, wherein the said back detector has an isotropic light-sensitive surface, and outputs position information as a continuous signal.

14. The optical system according to claim 1, wherein said capturing mirror has a drive for rotating it about its rotational axis, said drive comprising a control unit to adjust the capturing mirror in response to a signal from the front detector, regardless of the adjustment of the switching mirror and regardless of all position information output from the back detector.

15. The optical system according to claim 1, wherein the capturing mirror has a spatially fixed point of rotation on its mirror surface, being a micro-electro-mechanical actuator.

16. The optical system according to claim 1, wherein an optical path from the front beam splitter to the front detector is identical to an optical path from the front beam splitter to the switching mirror.

17. The optical system according to claim 1, wherein the input point and the predetermined separate output points are respective optical interfaces as respective fiber couplers or other optical elements.

18. The optical system according to claim 17, wherein said optical elements are collimation optics at the input point and respective coupling optics at each predetermined separate output point.

19. The optical system according to claim 1, wherein the switching and capturing mirrors, the foremost and back beam splitters and the foremost and back detectors are arranged in the form of a monolithic block with output points in the form of fiber couplers, said fiber couplers arranged on the monolithic block.

20. The optical system according to claim 1, further comprising a number of fiber couplers as module inputs and a cascade of the same number of beam combiners for the coaxial union of input light beams output from the fiber couplers into a common light beam, which passes to said capturing mirror via the input point of the optical switch, and respectively each having a fiber coupler as a module output with respective collimation optics at each module input and respective coupling optics at each module output.

21. The optical system according to claim 20, further comprising an acousto-optical element arranged in a common beam path between the last beam combiner and the capturing mirror of the optical switch.

22. The optical system according to claim 21, wherein said cascade comprises an additional beam combiner with an additional fiber coupler fixed on it, or a pilot laser directed at it which emits a wavelength that is above a cut-off wavelength diffracted by the acoustic optical element, said additional beam combiner and/or the additional fiber coupler or the pilot laser being so arranged that a light beam at the additional fiber coupler or the pilot laser enters the acousto-optical element arranged in the common beam path section at an angle other than that of the common light beam so that it exits from the acousto-optical element in the direction of a diffraction order of a wavelength of the common light beam.

23. A microscope having optics for viewing a specimen comprising a plurality of lasers and a cascade of a plurality of beam combiners for combining beams of said laser to form a common light beam, different optical measuring instruments, each measuring instrument having at least one input, or a multi-function measuring instrument having multiple different inputs, an optical switch having a single input point optically connected with said light beam for receiving light of said light beam, said optical switch configured for adjustably deflecting a light beam from the direction of an input point in the direction of one of a plurality of predetermined separate output points, said optical switch having a rotatable switching mirror, said switching mirror having an input point and a plurality of predetermined separate output points and configured to deflect said light beam from the direction of said input point in the direction of at least one of said predetermined separate output points and having a micro-electromechanical actuator and a control unit for adjusting said switching mirror, a rotatable capturing mirror, front and back beam splitters, and front and rear spatially-resolving detectors, said switching and capturing mirrors being rotatable about two respective axes, said front beam splitter arranged for partial coupling of said light beam optically between the capturing mirror and the switching mirror at said front detector, said back beam splitter arranged for partial decoupling of the light beam optically between the switching mirror and each of said predetermined separate output points at said back detector, and said control unit being arranged to control a drive of said switching mirror on the basis of a signal from said back detector, said common light beam passing to the capturing mirror via the input point of the optical switch, and optics to generate an infinitely focused beam in the region of the optical switch.

24. A microscope having optics for viewing a specimen comprising a plurality of lasers and a cascade of a plurality of beam combiners for combining beams of said laser to form a common light beam, an optical switch for adjustably deflecting a light beam from the direction of an input point in the direction of one of a plurality of predetermined separate output points, each such predetermined separate output point connected with an optical element which is different from the optical element of the other predetermined separate output points, said optical switch comprising a rotatable switching mirror, said switching mirror having an input point and a plurality of predetermined separate output points and configured to deflect said light beam from the direction of said input point in the direction of at least one of said predetermined separate output points and having a micro-electromechanical actuator and a control unit for adjusting said switching mirror, a rotatable capturing mirror, front and back beam splitters, and front and rear spatially-resolving detectors, said switching and capturing mirrors being rotatable about two respective axes, said front beam splitter arranged for partial coupling of said light beam optically between the capturing mirror and the switching mirror at said front detector, said back beam splitter arranged for partial decoupling of the light beam optically between the switching mirror and each of said predetermined separate output points at said back detector, and said control unit being arranged to control a drive of said switching mirror on the basis of a signal from said back detector, said common light beam passing to the capturing mirror via the input point of the optical switch, and a coupling module, to the connections of which a plurality of lasers is connected via an optical waveguide, said coupling module comprising a number of fiber couplers as module inputs and a cascade of the same number of beam combiners for the coaxial union of input light beams output from the fiber couplers into a common light beam, which passes to said capturing mirror via the input point of the optical switch, and respectively each having a fiber coupler as a module output with respective collimation optics at each module input and respective coupling optics at each module output.

25. The microscope according to claim 23, further comprising an acousto-optical element in the common beam path and a pilot laser whose light beam so enters the acousto-optical element that it emerges from it in the direction of a diffraction order of the common light beam, said pilot laser arranged to emit a wavelength that is above a cut-off wavelength diffracted by the acousto-optical element.

26. The microscope according to claim 25, wherein the back beam splitter and the front beam splitter of the optical switch for the non-diffractable wavelength are beam-splitting, and are at least substantially transparent for smaller wavelengths.

* * * * *